(12) United States Patent
Xiong et al.

(10) Patent No.: US 12,308,028 B2
(45) Date of Patent: May 20, 2025

(54) SPEECH RECOGNITION METHOD, APPARATUS AND DEVICE, AND STORAGE MEDIUM (71) Applicant: IFLYTEK CO., LTD., Anhui (CN)

(72) Inventors: Shifu Xiong, Anhui (CN); Cong Liu, Anhui (CN); Si Wei, Anhui (CN); Qingfeng Liu, Anhui (CN); Jianqing Gao, Anhui (CN); Jia Pan, Anhui (CN)

(73) Assignee: IFLYTEK CO., LTD., Anhui (CN)

( * ) Notice: Subject to any disclaimer, the term of this patent is extended or adjusted under 35 U.S.C. 154(b) by 269 days.

(21) Appl. No.: 17/925,483

(22) PCT Filed: Dec. 2, 2020

(86) PCT No.: PCT/CN2020/133286
§ 371 (c)(1),
(2) Date: Nov. 15, 2022

(87) PCT Pub. No.: WO2021/232746
PCT Pub. Date: Nov. 25, 2021

(65) Prior Publication Data
US 2023/0186912 A1  Jun. 15, 2023

(30) Foreign Application Priority Data
May 18, 2020 (CN) .......................... 202010418728.1

(51) Int. Cl.
*G10L 15/22* (2006.01)
*G10L 15/02* (2006.01)
(Continued)

(52) U.S. Cl.
CPC .............. *G10L 15/22* (2013.01); *G10L 15/02* (2013.01); *G10L 15/197* (2013.01);
(Continued)

(58) Field of Classification Search
CPC .......... G10L 15/08; G10L 15/22; G10L 15/02; G10L 15/197; G10L 15/063; G10L 15/16; G10L 2015/088; G10L 2015/223
(Continued)

(56) References Cited

U.S. PATENT DOCUMENTS 4,520,499 A    5/1985  Montlick et al.
8,548,812 B2 * 10/2013  Whynot .................. G10L 15/22
                                                    704/270.1
(Continued)

FOREIGN PATENT DOCUMENTS

CN    102592595 A    7/2012
CN    102968987 A    3/2013
(Continued)

OTHER PUBLICATIONS

International Search Report and Written Opinion issued in PCT/CN2020/133286 mailed Mar. 5, 2021, 13 pages.
(Continued)

*Primary Examiner* — Md S Elahee
(74) *Attorney, Agent, or Firm* — Zhong Law, LLC (57) ABSTRACT A speech recognition method and related products are provided. The method includes acquiring a to-be-recognized speech and a configured hot word library; determining, based on the to-be-recognized speech and the hot word library, an audio-related feature used at a current decoding time instant; determining, based on the audio-related feature, a hot word-related feature used at the current decoding time instant from the hot word library; and determining, based on the audio-related feature and the hot word-related feature, a recognition result of the to-be-recognized speech at the current decoding time instant.

12 Claims, 5 Drawing Sheets (51) Int. Cl.
   *G10L 15/197* (2013.01)
   *G10L 15/06* (2013.01)
   *G10L 15/08* (2006.01)

(52) U.S. Cl.
   CPC ...... *G10L 15/063* (2013.01); *G10L 2015/088* (2013.01); *G10L 2015/223* (2013.01)

(58) Field of Classification Search
   USPC ........................................................ 704/257
   See application file for complete search history.

(56) References Cited

U.S. PATENT DOCUMENTS

| | | | |
|---|---|---|---|
| 2015/0127594 A1 | 5/2015 | San Martin et al. | |
| 2015/0161990 A1 | 6/2015 | Sharifi | |

FOREIGN PATENT DOCUMENTS

| | | | |
|---|---|---|---|
| CN | 103310790 A | | 9/2013 |
| CN | 105719649 A | | 6/2016 |
| CN | 105955953 A | | 9/2016 |
| CN | 108228565 A | | 6/2018 |
| CN | 108831456 A | | 11/2018 |
| CN | 108899030 A | | 11/2018 |
| CN | 108984529 A | | 12/2018 |
| CN | 109215662 A | | 1/2019 |
| CN | 109523991 A | | 3/2019 |
| CN | 109726000 A | * | 5/2019 |
| CN | 110047467 A | | 7/2019 |
| CN | 110415705 A | | 11/2019 |
| CN | 110517692 A | | 11/2019 |
| CN | 110879839 A | | 3/2020 |
| CN | 110956959 A | | 4/2020 |
| CN | 111009237 A | | 4/2020 |
| CN | 111105799 A | | 5/2020 |
| CN | 111583909 A | | 8/2020 |
| IN | 109559752 A | | 4/2019 |

OTHER PUBLICATIONS

Chinese Office Action issued in Chinese Application No. 2020104187281 mailed Jan. 11, 2023, 15 pages.

European Search Report for EP Application No. 20936660.8, dated Apr. 10, 2024.

He et al: "Streaming small-footprint keyword spotting using sequence-to-sequence models", dated Dec. 2017, pp. 474-481.

* cited by examiner

SPEECH RECOGNITION METHOD, APPARATUS AND DEVICE, AND STORAGE MEDIUM

FIELD

This application is the national phase of International Patent Application No. PCT/CN2020/133286, titled "SPEECH RECOGNITION METHOD, APPARATUS AND DEVICE, AND STORAGE MEDIUM", filed on Dec. 2, 2020, which claims the priority to Chinese Patent Application No. 202010418728.1 titled "SPEECH RECOGNITION METHOD, APPARATUS AND DEVICE, AND STORAGE MEDIUM", filed on May 18, 2020 with the China National Intellectual Property Administration (CNIPA), both of which are incorporated herein by reference in their entireties.

BACKGROUND

Speech recognition is to recognize input speech data to obtain recognition text content corresponding to the speech. With the development of deep learning based on sequence modeling, end-to-end modeling is a research focus point in the field of speech recognition.

Figure 1:
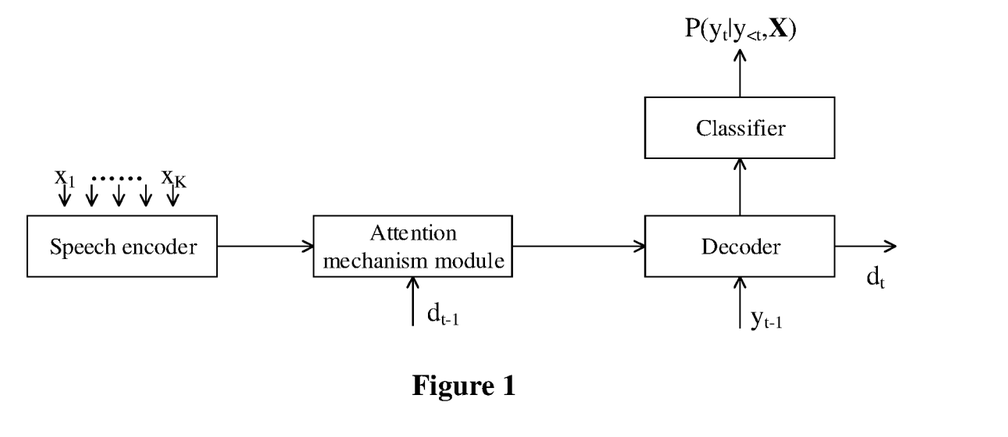
FIG. 1 shows an end-to-end framework for recognizing a speech based on an attention mechanism according to the conventional technology.

As shown in FIG. 1, an end-to-end framework for recognizing an input speech based on the attention mechanism according to the conventional technology may encode the input speech into encoded audio, process the encoded audio based on the attention mechanism, and acquire a recognition text corresponding to the input speech through decoding and classification. Such speech recognition method requires a large amount of training data, which may result in overconfidence in the trained model. The over confident model can calculate a posterior probability with a very sharp score. That is, the model may generate excellent recognition results and high scores for high-frequency words but generate poor recognition results and low scores for low-frequency words. The model may regard some hot words, such as technology terminologies and real-time hot words generated in daily social activities, as the low-frequency words and therefore produce poor recognition results for these hot words.

SUMMARY

In view of the above discussion, this disclosure provides a speech recognition method, a speech recognition apparatus and a speech recognition device, and a storage medium are provided, to solve the problem of poor recognition results on the hot words by using the conventional speech recognition solution. The technical solutions according to implementations of the present disclosure are as follows.

A speech recognition method is provided according to a first aspect of the present disclosure. The method includes:
  acquiring a to-be-recognized speech and a configured hot word library;
  determining, based on the to-be-recognized speech and the hot word library, an audio-related feature used at a current decoding time instant;
  determining, based on the audio-related feature, a hot word-related feature used at the current decoding time instant from the hot word library; and
  determining, based on the audio-related feature and the hot word-related feature, a recognition result of the to-be-recognized speech at the current decoding time instant.

In an embodiment, the determining, based on the to-be-recognized speech and the hot word library, an audio-related feature used at a current decoding time instant includes
  acquiring decoded result information before the current decoding time instant; and
  determining, based on the decoded result information and the hot word library, the audio-related feature used at the current decoding time instant from the to-be-recognized speech.

In an embodiment, the process of determining, based on the to-be-recognized speech and the hot word library, an audio-related feature used at a current decoding time instant; determining, based on the audio-related feature, a hot word-related feature used at the current decoding time instant from the hot word library; and determining, based on the audio-related feature and the hot word-related feature, a recognition result of the to-be-recognized speech at the current decoding time instant includes:
  processing by a pre-trained speech recognition model, the to-be-recognized speech and the hot word library, to obtain the recognition result of the to-be-recognized speech outputted by the speech recognition model, where
  the speech recognition model is capable of receiving and processing the to-be-recognized speech and the hot word library to output the recognition result of the to-be-recognized speech.

In an embodiment, the speech recognition model includes an audio encoding module, a hot word encoding module, a joint attention module, a decoding module and a classifying module.

The audio encoding module is configured to encode the to-be-recognized speech, to obtain an audio encoding result.

The hot word encoding module is configured to encode each of the hot words in the hot word library, to obtain a hot word encoding result.

The joint attention module is configured to receive and process the audio encoding result and the hot word encoding result, to obtain a combined feature used at the current decoding time instant, where the combined feature includes the audio-related feature and the hot word-related feature.

The decoding module is configured to receive and process the combined feature used at the current decoding time instant, to obtain an output feature of the decoding module at the current decoding time instant.

The classifying module is configured to determine the recognition result of the to-be-recognized speech at the current decoding time instant by using the output feature of the decoding module at the current decoding time instant.

In an embodiment, the joint attention module includes a first attention model and a second attention model.

The first attention model is used to determine the audio-related feature used at the current decoding time instant from the audio encoding result based on a state vector outputted by the decoding module at the current decoding time instant and the hot word encoding result, where the state vector represents the decoded result information.

The second attention model is used to determine the hot word-related feature used at the current decoding time instant from the hot word encoding result based on the audio-related feature.

The audio-related feature and the hot word-related feature are combined into the combined feature used at the current decoding time instant.

In an embodiment, the first attention model determining the audio-related feature used at the current decoding time instant from the audio encoding result based on a state vector outputted by the decoding module at the current decoding time instant representing the decoded result information and the hot word encoding result includes: taking the state vector and the hot word encoding result as inputs of the first attention model, and determining by the first attention model, the audio-related feature used at the current decoding time instant from the audio encoding result.

In an embodiment, the second attention model determining the hot word-related feature used at the current decoding time instant from the hot word encoding result based on the audio-related feature includes: taking the audio-related feature as an input of the second attention model, and determining by the second attention model, the hot word-related feature used at the current decoding time instant from the hot word encoding result.

In an embodiment, classification nodes of the classifying module include fixed commonly-used character nodes and dynamically expandable hot word nodes, and the classifying module determining the recognition result of the to-be-recognized speech at the current decoding time instant by using the output feature of the decoding module at the current decoding time instant includes:
  determining by the classifying module, a probability score of each of the commonly-used character nodes and a probability score of each of the hot word nodes by using the output feature of the decoding module at the current decoding time instant; and
  determining the recognition result of the to-be-recognized speech at the current decoding time instant based on the probability scores of the commonly-used character nodes and the probability scores of the hot word nodes.

In an embodiment, the dynamically expandable hot word nodes and the hot words in the hot word library are in a one-to-one correspondence.

In an embodiment, the acquiring a to-be-recognized speech and a configured hot word library includes acquiring the to-be-recognized speech, and determining a scenario of the to-be-recognized speech; and acquiring a hot word library related to the scenario.

In an embodiment, the acquiring a to-be-recognized speech and a configured hot word library includes acquiring a speech of a user in a scenario of human-computer interaction, and determining the speech as the to-be-recognized speech; and acquiring the predetermined hot word library formed by operation keywords in a voice command of the user in the scenario of human-computer interaction.

In an embodiment, the method further includes determining an interaction response matching the recognition result based on the recognition result of the to-be-recognized speech, and outputting the interaction response.

A speech recognition apparatus is provided according to a second aspect of the present disclosure. The apparatus includes
  a data acquiring unit, configured to acquire a to-be-recognized speech and a configured hot word library;
  an audio-related feature acquiring unit, configured to determine, based on the to-be-recognized speech and the hot word library, an audio-related feature used at a current decoding time instant;
  a hot word-related feature acquiring unit, configured to determine, based on the audio-related feature, a hot word-related feature used at the current decoding time instant from the hot word library; and
  a recognition result acquiring unit, configured to determine, based on the audio-related feature and the hot word-related feature, a recognition result of the to-be-recognized speech at the current decoding time instant.

A speech recognition device is provided according to a third aspect of the present disclosure. The device includes:
  a memory, configured to store a program; and
  a processor, configured to execute the program, to perform the speech recognition method as described above.

A readable storage medium is provided according to a fourth aspect of the present disclosure. The readable storage medium stores a computer program. The computer program, when being executed by a processor, performs the speech recognition method as described above.

A computer program product is provided according to a fifth aspect of the present disclosure. The computer program product, when being executed on a terminal device, causes the terminal device to perform the speech recognition method described above.

It can be seen from the above solutions that, in the speech recognition method according to the present disclosure, may configure a hot word library of the hot words that may be present in the to-be-recognized speech. In the process of recognizing the to-be-recognized speech, the audio-related feature used at the current decoding time instant is determined based on the to-be-recognized speech and the hot word library. Since the determination of the audio-related feature uses hot word information, if a speech segment at the current decoding time instant includes a hot word, the determined audio-related feature includes complete audio information corresponding to the hot word instead of partial audio information. Further, the hot word-related feature used at the current decoding time instant is determined from the hot word library based on the audio-related feature. Since the audio-related feature includes the complete audio information corresponding to the hot word, the determined hot word-related feature can accurately indicate whether the speech segment at the current decoding time instant includes any hot word and which hot word is specifically included. Finally, the recognition result of the to-be-recognized speech at the current decoding time instant is determined based on the audio-related feature and the hot word-related feature, thereby resulting in more accurate recognition result for the hot words.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

To solve the problem that the speech recognition method has a poor recognition result the on hot words according to the conventional technology, inventors of the present disclosure perform the following research: assigning incentive to a score of the hot word, that is, assigning incentive to a score of a candidate recognition character, which is a hot word, among the candidate recognition characters outputted by a speech recognition model, to improve a recognition rate of the hot word.

Further research shows that in an end-to-end speech recognition model, hot words, namely low-frequency words, often receive low scores to be discarded in a decoding process, or even have no chance for incentives, which cannot really improve the recognition result on the hot words.

Figure 2:
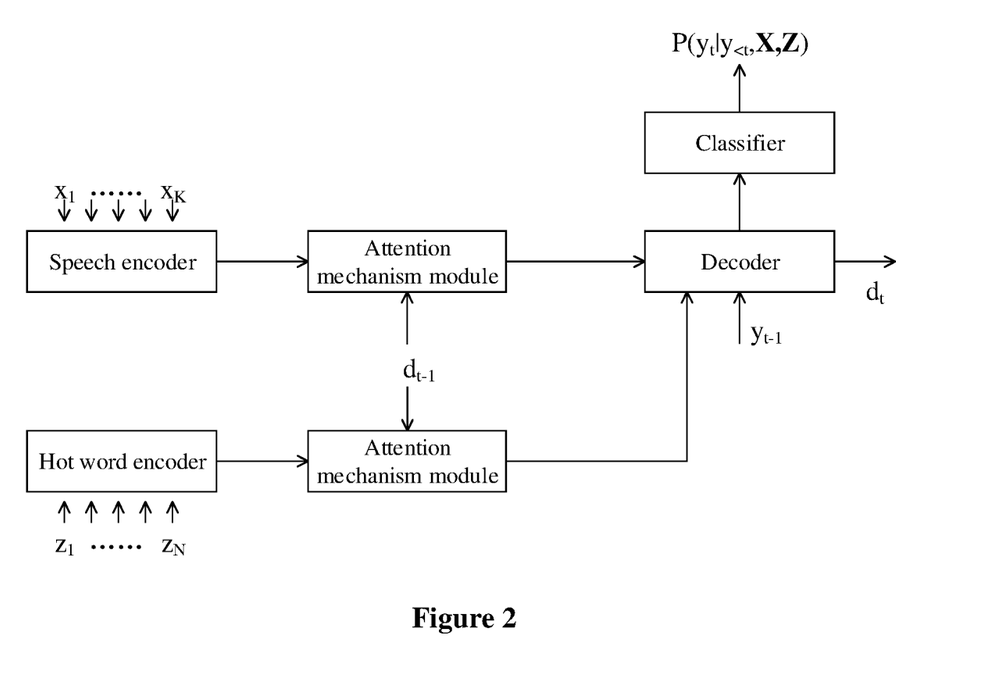
FIG. 2 shows an improved end-to-end framework for recognizing a speech based on an attention mechanism according to an embodiment of the present disclosure.

Therefore, a solution for improving scores of the hot words at a model level is further provided in the disclosure, and is implemented by modifying a structure of the speech recognition model. A schematic framework of the modified speech recognition model is shown in FIG. 2.

Compared with the conventional speech recognition model, the speech recognition model according to the present disclosure is provided with a Bias Encoder, which is configured to encode the hot words. Further, an audio encoding feature and a hot word encoding feature are processed by using state information of a decoder based on an attention mechanism, to obtain an audio-related feature and a hot word-related feature used for decoding. The audio-related feature and the hot word-related feature are decoded and classified to obtain a recognition text corresponding to an input speech.

The above solution considers hot words from the level of the model structure, and thus achieves a better result than the method for directly assigning incentives for the scores of the hot words outputted by the model.

The in-depth research by the inventors shows that information used to accurately determine whether the speech includes hot words and which hot words are there in the speech varies for different hot words due to different lengths of these hot words. The state information of the decoder only includes a historical text and historical audio information of a decoded result. If the state information including only historical information serves as a query of the attention mechanism, the audio-related feature obtained by performing the attention operation on the audio encoding feature may be incomplete, and the hot word-related feature obtained by performing the attention operation on the hot word encoding features may be inaccurate, resulting in a low recognition accuracy for the hot words.

Therefore, the inventor proposes another further improvement solution to solve the above problems. Next, the speech recognition method according to the present disclosure is described in detail.

It can be understood that the speech recognition method according to the present disclosure may be applied to any scenario for recognizing a speech. The speech recognition method may be implemented by an electronic device, such as a mobile phone, a translator, a computer, a server and other devices with data processing capabilities.

Figure 3:
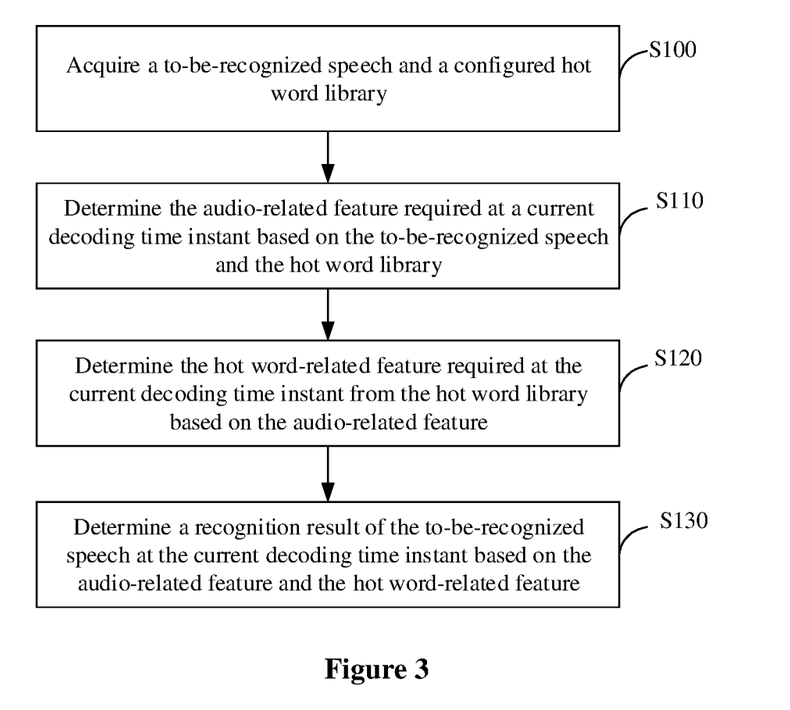
FIG. 3 shows a flow chart of a speech recognition method according to an embodiment of the present disclosure.

Next, the speech recognition method according to the present disclosure is described in combination with the flow shown in FIG. 3. The method includes the following steps S100 to S130.

In step S100, a to-be-recognized speech and a configured hot word library are acquired.

Specifically, a speech that is to be recognized in a current speech recognition task serves as the to-be-recognized speech. Before the speech is recognized, the configured hot word library may be acquired and multiple hot words are stored in the hot word library. It can be understood that the hot word library may be formed by hot words related to the speech recognition task including all potential hot words, such as technology terminologies, in the to-be-recognized speech.

In addition, some existing hot word libraries may be called as the hot word library configured in this embodiment. In step S110, the audio-related feature used at a current decoding time instant is determined based on the to-be-recognized speech and the hot word library.

Specifically, in order to improve the recognition result on the hot words, in a case that a to-be-decoded character is a potential hot word, it is used to acquire complete audio information of the potential hot word. Therefore, in this step, in order to ensure that the obtained audio-related feature used at the current decoding time instant includes the complete audio information of the potential hot word, the hot word library is taken into account, that is, the hot word library is involved in a calculation process of the audio-related feature, to detect whether the to-be-decoded character at the current decoding time instant is a hot word.

The finally obtained audio-related feature may include the complete audio information of the current to-be-decoded character.

In step S120, hot word-related feature used at the current decoding time instant is determined from the hot word library based on the audio-related feature.

The audio-related feature used at the current decoding time instant is determined in the step 110, and the hot word-related feature used at the current decoding time may be determined from the hot word library based on the audio-related feature. The hot word-related feature represents content of the hot word that may occur at the current decoding time instant.

It can be understood that since the audio-related feature includes the complete audio information of the current to-be-decoded character, the scheme of determining the hot word-related feature used at the current decoding time instant from the hot word library based on the audio-related feature is more suitable for the situations of varying lengths of hot words.

In step S130, a recognition result of the to-be-recognized speech at the current decoding time instant is determined based on the audio-related feature and the hot word-related feature.

After the audio-related feature and the hot word-related feature used at the current decoding time instant are acquired, the to-be-decoded character at the current time instant may be decoded and recognized based on the audio-related feature and the hot word-related feature, so as to determine the recognition result of the to-be-recognized speech at the current decoding time instant.

In the speech recognition method according to the embodiment of the present disclosure, a hot word library for the hot words that may be present in the to-be-recognized speech is provided. In the process of recognizing the to-be-recognized speech, the audio-related feature used at the current decoding time instant is determined based on the to-be-recognized speech and the hot word library. Since the determination of the audio-related feature uses hot word information, if a speech segment at the current decoding time instant includes a hot word, the determined audio-related feature includes complete audio information corresponding to the hot word instead of partial audio information. Further, the hot word-related feature used at the current decoding time instant is determined from the hot word library based on the audio-related feature. Since the audio-related feature includes the complete audio information corresponding to the hot word, the determined hot word-related feature can accurately indicate whether the speech segment at the current decoding time instant includes any hot word and which hot word is specifically included. Finally, the recognition result of the to-be-recognized speech at the current decoding time instant is determined based on the audio-related feature and the hot word-related feature, thereby producing more accurate recognition for the hot words.

The process of acquiring the to-be-recognized speech and the configured hot word library in the step S100 is described according to embodiments of the present disclosure.

In an embodiment, after the to-be-recognized speech is acquired, a scenario of the to-be-recognized speech may be determined. Further, a hot word library corresponding to the scenario may be acquired as the hot word library configured in the present disclosure.

It can be understood that to-be-recognized speeches generated in different scenarios may include different hot words. Therefore, hot word libraries corresponding to respective scenarios may be predetermined according to the present disclosure; and after a scenario of the to-be-recognized speech is determined, a hot word library corresponding to the scenario is acquired.

In another embodiment, the solution according to the present disclosure is used for recognizing a speech in a scenario of human-computer interaction.

It can be understood that in the scenario of human-computer interaction, interaction between a user and a machine may involve voice commands from the user, that is, the user sends the voice commands to the machine for certain purposes. For example, the user controls a smart TV to perform an operation such as, changing a channel, or turning up or down volume of the smart TV, via voice control. For another example, the user controls an intelligent robot to perform a predetermined operation such as, playing a song, or checking the weather, via voice control.

Based on this, the machine is used to accurately recognize the voice commands, to correctly respond. Therefore, operation keywords in the voice commands of the user may form a hot word library according to the present disclosure.

Based on this, according to the embodiment of the present disclosure, a speech of the user in the scenario of human-computer interaction may be acquired as the to-be-recognized speech, and the predetermined hot word library, formed by the operation keywords in the voice commands of the user in the scenario of human-computer interaction, is acquired.

Based on the above, after the recognition result of the to-be-recognized speech is determined according to the solution of the present disclosure, an interaction response matching the recognition result is determined based on the recognition result, and the interaction response may be outputted.

According to the solution of the embodiment, the command of the user in the process of human-computer interaction may be accurately recognized, so that the machine can make an interaction response matching with the command based on a correct recognition result.

In another embodiment of the present disclosure, for the step S110, the audio-related feature used at the current decoding time instant is determined based on the to-be-recognized speech and the hot word library.

Specifically, frames constituting the to-be-recognized speech form contexts for each other. In order to determine the audio-related feature used at the current decoding time instant, decoded result information before the current decoding time instant may be first acquired in the embodiment. The decoded result information may include text information and audio information of character(s) that has (have) been decoded.

In addition, in order to improve the recognition result on hot words, in a case that the to-be-decoded character is a potential hot word, it is used to acquire complete audio information of the potential hot word. Therefore, in this step, in order to ensure that the obtained audio-related feature used at the current decoding time instant includes the complete audio information of the potential hot word, the hot word library is taken into account, that is, the hot word library is involved in a calculation process of determining the audio-related feature, to detect whether the to-be-decoded character at the current decoding time instant is a hot word. Based on this, the hot word-related feature used at the current decoding time instant is determined from the hot word library based on the audio-related feature, which is more suitable for the situation of varying lengths of hot words.

The process of determining the audio-related feature in step S110 may include the following steps S1 and S2.

In step S1, decoded result information before the current decoding time instant is acquired.

In step S2, the audio-related feature used at the current decoding time instant is determined from the to-be-recognized speech based on the decoded result information and the hot word library.

In the embodiment, an audio feature of the to-be-recognized speech may be first determined. The audio characteristic may be a FilterBank feature, a Mel frequency cepstral coefficient (MFCC) feature, a perceptual linear prediction (PLP) feature, or the like. Further, the audio-related feature used at the current decoding time instant is determined from the audio characteristic of the to-be-recognized speech based on the decoded result information and the hot word library.

The audio-related feature carries complete audio information of the to-be-decoded character at the current decoding time instant. Hence, enough audio-related features for accurately recognizing a hot word are provided.

In another embodiment of the present disclosure, an alternative implementation of steps S110 to S130 in the above embodiment is provided, including determining the audio-related feature and the hot word-related feature used at the current decoding time instant, and determining the recognition result of the to-be-recognized speech at the current decoding time instant based on the audio-related feature and the hot word-related feature.

The method may be implemented by a speech recognition model.

The speech recognition model according to the embodiment is different from the conventional speech recognition model. The speech recognition model in the embodiment is configured to receive and process the to-be-recognized speech and the hot word library, to output the recognition result of the to-be-recognized speech.

Specifically, the speech recognition model may be configured to determine, based on the decoded result information before the current decoding time instant and the hot word library, the audio-related feature used at the current decoding time instant from the to-be-recognized speech; determine, based on the audio-related feature, the hot word-related feature used at the current decoding time instant from the hot word library; and determine, based on the audio-related feature and the hot word-related feature, the recognition result of the to-be-recognized speech at the current decoding time instant.

Based on this, in the embodiment, the to-be-recognized speech and the hot word library acquired in step S100 may be processed by using the speech recognition model, and then the speech recognition model may output the recognition result of the to-be-recognized speech.

The audio feature of the to-be-recognized speech and the hot word library may be inputted into the speech recognition model, to obtain the recognition result of the to-be-recognized speech outputted by the model.

Figure 4:
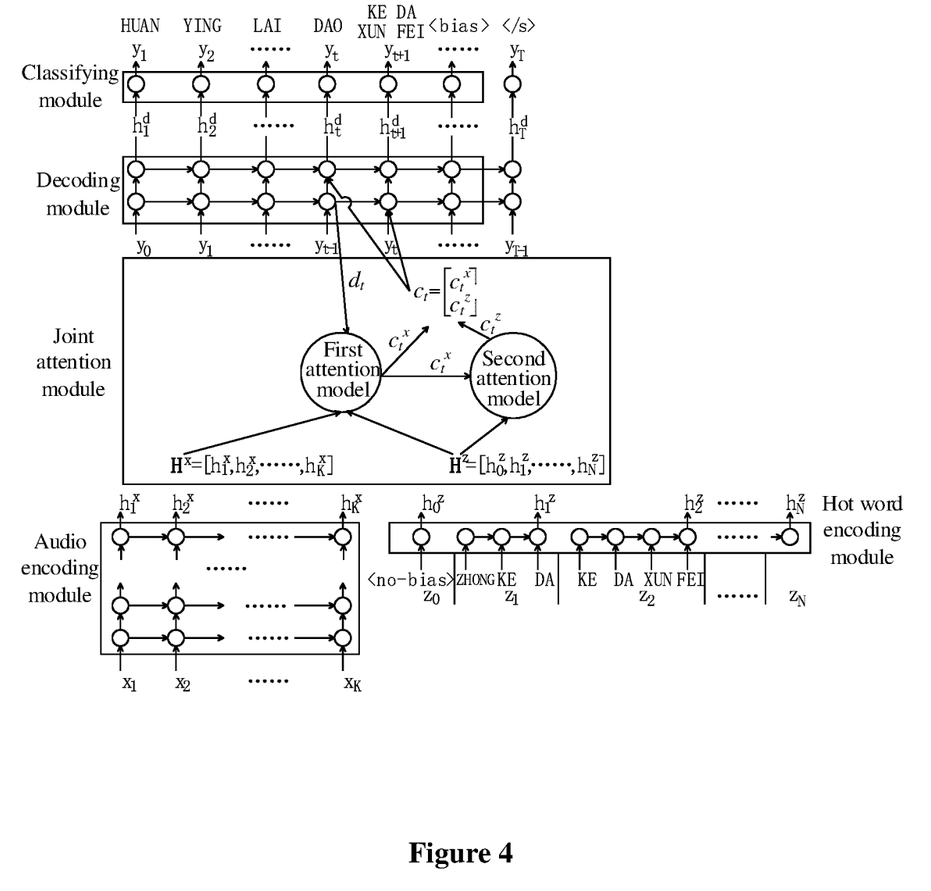
FIG. 4 shows an improved end-to-end framework for recognizing a speech based on an attention mechanism according to another embodiment of the present disclosure.

Next, as shown in FIG. 4, a framework of the speech recognition model is introduced.

The speech recognition model may include an audio encoding module, a hot word encoding module, a joint attention module, a decoding module and a classifying module. The modules cooperatively process hot words in the hot word library and the audio feature of the to-be-recognized speech, to output the recognition result. Next, each of the modules is introduced.

For convenience of description, the audio feature of the to-be-recognized speech is defined as $X=[x_1, x_2, \ldots, x_k]$, where $x_k$ represents an audio feature vector of a k-th frame, and k represents the total number of frames of the to-be-recognized speech.

1. Audio Encoding Module

The audio encoding module encodes the to-be-recognized speech, to obtain an audio encoding result.

The audio encoding module may encode the audio feature X of the to-be-recognized speech, to obtain an encoded audio feature vector sequence formed by encoded audio feature vectors of all frames.

The audio feature vector sequence obtained after encoding is expressed as: $H^x=[h_1^x, h_2^x, \ldots, h_k^x]$, where $h_k^x$ represents an encoded audio feature vector of the k-th frame, and $h_k^x$ corresponds to a result of encoding $x_k$ by the audio encoding module.

The audio encoding module may include one or more encoding layers. The encoding layer may be a long short-term memory layer in a unidirectional or bidirectional long short-term memory neural network or a convolution layer in a convolutional neural network, depending on the actual requirements. For example, for speech recognition with real-time requirements, three to five unidirectional long short-term memory layers may be used; and for speech recognition without real-time requirements, three to five bidirectional long short-term memory layers may be used. The real-time requirement refers to recognizing while speaking, rather than waiting for the speech to finish and then outputting a complete recognition result.

In the embodiment, the inputted audio feature $X=[x_1, x_2, \ldots, x_k]$ is processed by using five unidirectional long short-term memory layers, and then the encoded audio feature vector sequence $H^x=[h_1^x, h_2^x, \ldots, h_k^x]$ is outputted.

2. Hot Word Encoding Module

The hot word encoding module encodes each of the hot words in the hot word library, to obtain a hot word encoding result.

Specifically, the hot word encoding module encodes each hot word in the hot word library separately, to obtain a hot word feature vector sequence formed by hot word feature vectors obtained by encoding respective hot words.

The hot word library includes N+1 hot words expressed as $Z=[z_0, z_1, \ldots, z_N]$, where $z_N$ represents an N-th hot word. $z_0$ represents a special hot word <no-bias>, and indicates "not a hot word". During the decoding process, the hot word $z_0$ indicates that the to-be-decoded character at the current decoding time instant is not a hot word. $z_0$ is used for a case that the speech segment currently subjected to the recognition is not a hot word.

If the total number of the hot words is N+1, the hot word encoding module encodes each of the hot words separately, to obtain the hot word feature vector sequence expressed as: $H^z=[h_0^z, h_1^z, \ldots, h_N^z]$, where $h_N^z$ represents a hot word feature vector obtained by encoding the N-th hot word by the hot word encoding module.

It can be understood that different hot words include different numbers of characters. For example, Chinese expressions "ZHONG KE DA" and "KE DA XUN FEI", if defined as hot words, include three and four Chinese characters, respectively.

In order to facilitate model processing, in the embodiment, hot words with different lengths may be encoded into vectors with a same dimension. Specifically, the hot word encoding module may respectively encode the hot words into hot word feature vectors with a same dimension according to a predetermined dimension.

Figure 5:
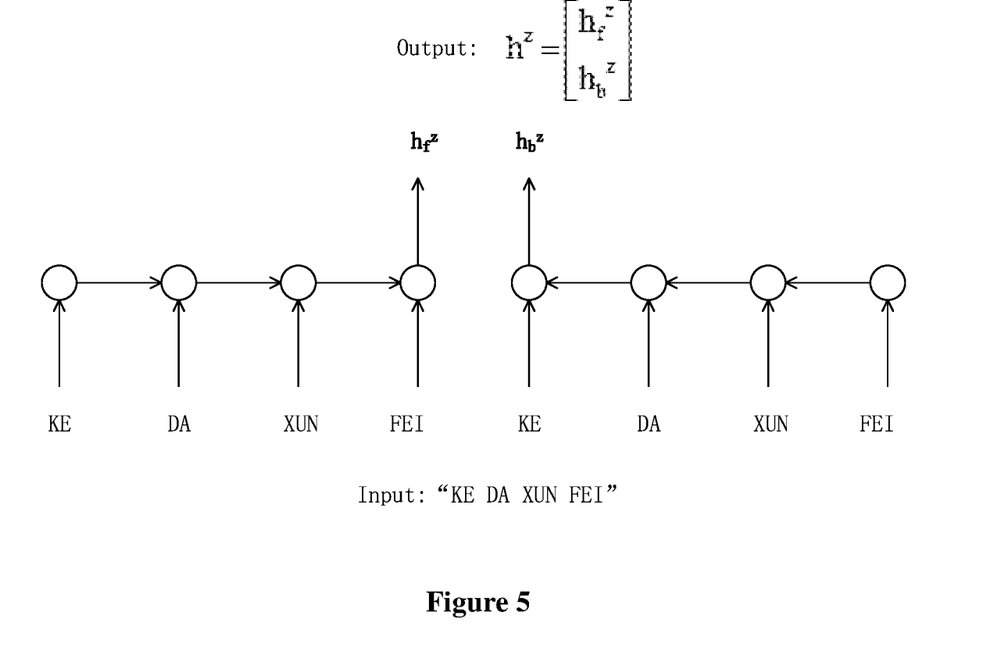
FIG. 5 is a schematic diagram showing how a hot word encoder with a bidirectional long short-term memory layer encodes hot words according to an embodiment of the present disclosure.

The hot word encoding module may include one or more encoding layers. The encoding layer may be a long short-term memory layer in a unidirectional or bidirectional long short-term memory neural network or a convolution layer in a convolutional neural network. In general, the bidirectional long short-term memory layer that can observe information on the left and right has a better encoding effect on hot words than the unidirectional long short-term memory layer. For example, one bidirectional long short-term memory layer is used, and the hot word is Chinese expression "KE DA XUN FEI" formed by four Chinese characters of "KE", "DA", "XUN" and "FEI". FIG. 5 shows a process for the hot word encoding module formed by one bidirectional long short-term memory layer to encode the hot word.

In FIG. 5, the left side shows a forward part of the bidirectional long short-term memory layer, and the right side shows a reverse part of the bidirectional long short-term memory layer. A vector $h_f^z$ outputted from the forward part is combined with a vector $h_b^z$ outputted from reverse part, to obtain a vector $h^z$ representing an encoded vector of the hot word.

3. Joint Attention Module

The joint attention module is configured to receive and process the audio encoding result and the hot word encoding result, to obtain a combined feature used at the current decoding time instant. The combined feature includes the audio-related feature and the hot word-related feature.

A framework of the joint attention module is provided according to the embodiment. As shown in FIG. 4, the joint attention module may include a first attention model and a second attention model.

The first attention model may determine the audio-related feature used at the current decoding time instant from the audio encoding result based on a state vector representing the decoded result information outputted by the decoding module at the current decoding time instant and the hot word encoding result.

The state vector and the hot word encoding result may serve as inputs of the first attention model, and the first attention model may determine the audio-related feature used at the current decoding time instant from the audio encoding result.

The second attention model may determine the hot word-related feature used at the current decoding time instant from the hot word encoding result based on the audio-related feature.

The audio-related feature may serve as an input of the second attention model, and the second attention model may determine the hot word-related feature used at the current decoding time instant from the hot word encoding result.

Finally, the audio-related feature and the hot word-related feature are combined into the combined feature used at the current decoding time instant.

It can be seen from the above that the state vector outputted by the decoding module at the current decoding time instant may represent the decoded result information, and thus an attention mechanism operation may be performed on the audio encoding result based on the state vector and the hot word encoding result, to determine the audio-related feature used at the current decoding time instant. That is, the first attention model in the embodiment is based on the joint attention mechanism combining the audio and the hot word, so that the hot word is involved in the calculation process of the audio-related feature. Since hot word information is used, if the to-be-decoded character at the current decoding time instant is a hot word, the audio-related feature may include complete audio information corresponding to the hot word.

Further, the attention mechanism operation is performed on the hot word encoding result by using the audio-related feature, to determine the hot word-related feature used at the current decoding time instant. The audio-related feature may include the complete audio information corresponding to the hot word, so that the hot word-related feature obtained in this way is more accurate.

In the attention mechanism, a vector serves as a query. The attention mechanism operation is performed on a feature vector sequence, and a feature vector that best matches the query is selected as an output. Specifically, matching coefficients between the query and all feature vectors in the feature vector sequence are calculated, products of the matching coefficients and respective corresponding feature vectors are calculated, and then a sum of the products is calculated as a new feature vector. The new feature vector is the feature vector that best matches the query.

It is defined that, t represents the current decoding time instant, $d_t$ represents the state vector outputted by the decoding module at the current decoding time instant t, and the first attention model determines the audio-related feature $c_t^x$ used at the current decoding time instant from the audio feature vector sequence $H^x$ based on the state vector $d_t$ and the hot word feature vector sequence $H^z$. The second attention model performs the attention mechanism operation on the hot word feature vector sequence $H^Z$ by taking $c_t^x$ as the query to determine the hot word-related feature $c_t^z$ used at the current decoding time instant.

Next, the first attention model is described in detail.

First, the first attention model determines the combination of each hot word feature vector $h_i^z$ in the hot word feature vector sequence $H^z$ and the state vector $d_t$ as the query, performs the attention mechanism operation on each audio feature vector $h_j^x$ in the audio feature vector sequence $H^x$, to obtain a matching coefficient matrix $E^t$. The matching coefficient matrix $E^t$ includes a matching degree $e_{ij}^t$ between any hot word and any frame of speech. $e_{ij}^t$ represents a matching degree between an i-th hot word and a j-th frame of speech, that is, the probability that the j-th frame of speech is the i-th hot word.

The matching degree $e_{ij}^t$ is calculated according to the following equation:

$$e_{ij}^t = <W_d*d_t + W_z*h_i^z, W_x*h_j^x>$$

where, $W_d$, $W_z$, and $W_x$ represent model parameters, $W_d \in R^{D \times D_d}$, $W_z \in R^{D \times D_z}$, $W_x \in R^{D \times D_x}$, $D_d$, $D_z$, and $D_x$ respectively represent a dimension of $d_t$, a dimension of $h_i^z$, and a dimension of $h_j^x$. The three matrices have the same number of rows, denoted as D. The operator $<.,.>$ represents inner product of vectors.

Elements $e_{ij}^t$ form the matching coefficient matrix $E^t$ for the hot words and frames of speech, $E^t \in R^{K \times (N+1)}$, where $e_{ij}^t$ represents an element at an i-th row and a j-th column in $E^t$. A column vector in $E^t$ represents a matching degree between a hot word and the audio feature vector sequence, and a row vector in $E^t$ represents a matching degree between an audio feature vector of a frame and the hot word feature vector sequence.

Further, the first attention model determines the audio-related feature $c_t^x$ used at the current decoding time instant from the audio feature vector sequence $H^x$ based on the matching coefficient matrix $E^t$.

The process includes the following steps S1 to S3.

In step S1, a probability $w^t$ that each hot word is the to-be-decoded character at the current decoding time instant is determined based on the matching coefficient matrix $E^t$.

The element at an i-th row and a j-th column in $E^t$ represents a probability that the j-th frame of speech is the i-th hot word. Softmax normalization is performed on all rows in $E^t$, and then all row vectors are summed up and averaged to obtain an (N+1)-dimensional row vector. The row vector is expressed as $$w^t = \lfloor w_0^t, w_1^t, \ldots w_i^t, \ldots w_N^t \rfloor,$$

where, $w_i^t$ represents a probability that the to-be-decoded character at the current decoding time instant t is the i-th hot word. That is, it is determined which hot word is most likely to appear in the speech at the current decoding time instant t.

In step S2, a probability $a^t$ that each frame of speech is speech content used at the current decoding time instant is determined based on the matching coefficient matrix $E^t$ and the probability $w^t$ that each hot word is the to-be-decoded character at the current decoding time instant.

Specifically, softmax normalization is performed on all columns in matrix $E^t$, to obtain a matrix $A^t$ with normalized column vectors. By taking elements in the matrix $w^t$ as weighting coefficients of the column vectors in the matrix $A^t$, all the column vectors in the matrix $A^t$ are weighted and summed up to obtain a k-dimensional row vector. The k-dimensional row vector is expressed as at $a^t = [a_1^t, a_2^t, \ldots a_j^t, \ldots a_K^t]$, where $a_j^t$ represents a probability that the j-th frame of audio feature is speech content used at the current decoding time instant t.

In step S3, by taking the probability $a^t$ that each frame of speech is the speech content used at the current decoding time instant as a weighting coefficient, audio feature vectors of all frames of speech in the audio feature vector sequence $H^x$ are weighted and summed up to obtain an audio-related feature $c_t^x$ used at the current decoding time instant.

By taking elements in $a^t$ as the weighting coefficients of the audio feature vectors at corresponding positions in the audio feature vector sequence $H^x = [h_1^x, h_2^x, \ldots, h_k^x]$, the audio feature vectors are weighted and summed to obtain the audio feature vector $c_t^x$.

Further, the second attention model is described in detail.

The second attention model determines a hot word-related feature $c_t^z$ used at the current decoding time instant from the hot word feature vector sequence $H^z$ based on the audio-related feature $c_t^x$.

The process includes the following steps S1 to S2.

In step S1, the second attention model determines the audio-related feature $c_t^x$ as the query, performs the attention mechanism operation on the hot word feature vector sequence $H^a$ to obtain a hot word matching coefficient vector $b^t$. The hot word matching coefficient vector $b^t$ includes probabilities that every hot word is a to-be-decoded character at the current decoding time instant. $b^t$ is expressed as: $b^t = [b_0^t, b_1^t, \ldots, b_i^t, \ldots b_N^t]$, where $b_i^t$ represents a probability that the i-th hot word is the to-be-decoded character at the current decoding time instant.

Matching coefficients between $c_t^x$ and all the hot word feature vectors are respectively calculated by a small neural network, and then softmax normalization is performed on the matching coefficients to obtain $b_i^t$:

In step S2, by taking the probability $b_i^t$ that each hot word is the to-be-decoded character at the current decoding time instant as the weighting coefficient, the hot word feature vectors of all hot words in the hot word feature vector sequence $H^z$ are weighted and summed to obtain the hot word-related feature used at the current decoding time instant.

Since $c_t^x$ includes the complete audio information of the potential hot word, rather than partial information of the hot word, the hot word-related feature $c_t^z$ determined in this way is more accurate.

The $c_t^x$ and $c_t^z$ are combined into the combined feature $c_t$ used at the current decoding time instant, and then the combined feature $c_t$ is transmitted to the decoding module.

Further, the probability $b^t$ of the to-be-decoded character at the current decoding time instant determined above may be transmitted to the classifying module for classifying the hot words.

4. Decoding Module

The decoding module is configured to receive and process the combined feature used at the current decoding time instant outputted by the joint attention module, to obtain an output feature of the decoding module at the current decoding time instant.

The decoding module may calculate the state vector $d_t$ at the current decoding time instant t by using the combined feature $c_{t-1}$ used at a decoding time instant t−1 prior to the current decoding time instant t and a result character recognized at the previous decoding time instant t−1.

The state vector $d_t$ has the following two functions.

For one thing, the state vector $d_t$ is transmitted to the joint attention module, so that the joint attention module performs the process described in the above embodiment, to obtain the combined feature $c_t$ at the current decoding time instant.

For another thing, the decoding module calculates the output feature $h_t^d$ of the decoding module at the current decoding time instant by using the state vector $d_t$ at the current decoding time instant and the combined feature $c_t$ used at the current decoding time instant.

It should be noted that the decoding module may include multiple neural network layers. For example, two unidirectional long short-term memory layers may be used in the present disclosure. When decoding the to-be-decoded character at the current time instant t, the state vector $d_t$ of the decoding module at the current decoding time instant is calculated by taking the result character recognized at the time instant t−1 and the combined feature $c_{t-1}$ outputted by the joint attention module as inputs of a first long short-term memory layer. The decoding module calculates the output feature $h_t^d$ of the decoding module by taking $d_t$ and $c_t$ as inputs of a second long short-term memory layer.

5. Classifying Module

The classifying module determines the recognition result of the to-be-recognized speech at the current decoding time instant by using the output feature of the decoding module at the current decoding time instant.

Specifically, the classifying module may determine the recognition result of the to-be-recognized speech at the current decoding time instant by using the output feature $h_t^d$ of the decoding module at the current decoding time instant.

It can be seen from the above that the output feature $h_t^d$ is determined based on the state vector $d_t$ of the decoding module and the combined feature $c_t$ used at the current decoding time instant, and $c_t^x$ in the combined feature $c_t$ includes the complete audio information of the potential hot word, rather than partial information of the hot word, so that the determined hot word-related feature $c_t^z$ is more accurate, and the final output feature $h_t^d$ is more accurate. Further, the recognition result determined based on this is accurate, and the recognition accuracy for the hot words can be improved.

In an embodiment of the present disclosure, the classifying module is implemented by the following two ways. In the first way, a conventional static classifier which has constant number of classification nodes and includes commonly-used characters is used. The classifying module may determine a scoring probability of each classification node character according to the output feature $h_t^d$, to get a final recognition result.

However, in the conventional static classifier, the hot words are represented as a combination of commonly used characters and the hot words are decoded character by character, which is prone to result in false-triggering of hot word by a non-hot word segment. For example, if the to-be-recognized speech is Chinese expression of "ZHE GE MO XING XUN FEI LE (This model is trained wrongly)", and the hot word is Chinese expression of "KE DA XUN FEI (IFLYTECH Company)", the recognition result by the static classifier may be Chinese expression of "ZHE GE MO XING XUN FEI LE" with homonym of "XUN". Since Chinese expression of "XUN FEI" in the "ZHE GE MO XING XUN FEI LE" has a same pronunciation as "XUN FEI" in the hot word "KE DA XUN FEI", and the static classifier decodes and assigns incentives for each character in the hot word, every character may be assigned with an incentive and in turn some characters in the speech segment that are homophonic to characters in the hot word may be mistakenly treated as a part of the hot word, that is, the Chinese character "XUN (trained)" in "ZHE GE MO XING XUN FEI LE (This model is trained wrongly)" is mistakenly recognized as the homophonic character "XUN" in the hot word "KE DA XUN FEI (IFLYTECH Company)".

Based on this, a new structure of a classifying module is provided according to the present disclosure. The classification nodes of the classifying module include not only fixed commonly-used character nodes but also dynamically expandable hot word nodes, so as to recognize the entire hot word by units of word, rather than recognizing and assigning incentives by units of characters in the hot words as in the conventional technology. In the above example for recognizing "ZHE GE MO XING XUN FEI LE (This model is trained wrongly)", since "XUN FEI (trained wrongly)" is homophonic to "XUN FEI" in the hot word "KE DA XUN FEI" and has a low matching degree with the hot word "KE DA XUN FEI", mistaken recognition of the entire hot word does not occur. In a case that the speech data includes a hot word, since the classification node in the classifying module according to the embodiment includes the entire hot word, the hot word can be recognized by units of word, thereby improving the recognition result on the hot words.

The number of hot word nodes in the classifying module according to the embodiment may vary according to scenarios. For example, if N hot words are in the hot word library corresponding to a current scenario, N hot word nodes may be preset. Taking Chinese speech recognition as an example, a Chinese character serves as a modeling unit. Assuming that the number of commonly-used Chinese characters is V, the number of the fixed commonly-used character nodes of the classifying module is V. In a case that N hot words are in the hot word library, the number of the hot word nodes in the classifying module may be N, that is, the total number of classification nodes of the classifying module is V+N.

Based on the new structure, the process for the classifying module to perform speech recognition may be as follows. The classifying module determines the probability score of each of the commonly-used character nodes and the probability score of each of the hot word nodes by using the output feature $h_t^d$ of the decoding module at the current decoding time instant; and then determines the final recognition result.

In an embodiment, the classifying module determines the probability score of each of the commonly-used character nodes and the probability score of each of the hot word nodes by using the output feature $h_t^d$ of the decoding module at the current decoding time instant.

In another embodiment, the classifying module determines the probability score of each of the commonly-used character nodes by using the output feature $h_t^d$ of the decoding module at the current decoding time instant, and determines the probability score of each hot word node by using the hot word matching coefficient vector $b^t$ described in the above embodiments.

It can be understood that the probability scores of the fixed commonly-used character nodes in the classifying module may be determined by a static classifier. Specifically, the static classifier determines the probability score of each of the commonly-used character nodes by using the output feature $h_t^d$ of the decoding module at the current decoding time instant.

The static classifier outputs a V-dimensional probability distribution, and the probability distribution is expressed as $P_v(y_t)=\text{softmax}(W*h_t^d)$, where $y_t$ represents the to-be-decoded character at the current decoding time instant t, and matrix W represents a model parameter of the static classifier. Assuming that a dimension of the output feature $h_t^d$ of the decoding module is M, W represents a V*M matrix. Elements in $P_v(y_t)$ represent the probability scores of commonly-used characters corresponding to commonly-used character nodes.

The probability scores of the dynamically expandable hot word nodes in the classifying module may be determined by a hot word classifier. Specifically, the hot word classifier may determine the probability score of each hot word node by using the hot word matching coefficient vector $b^t$.

As described above, the hot word matching coefficient vector $b^t$ includes the probability that each hot word is the to-be-decoded character at the current decoding time instant, and thus the probability may serve as the corresponding probability score of the hot word node.

The probability is expressed as $b_t=[b_0^t, b_1^t, \ldots, b_i^t, \ldots b_N^t]$, where $b_i^t$ represents a probability that an i-th hot word is a decoded character at the current decoding time instant, and may serve as a probability score of an i-th hot word node. A 0-th hot word is <no-bias>, and indicates "not a hot word". In a case that i is equal to 0, $b_0^t$ represents a probability score that the decoded result is "not a hot word".

The recognition result of the to-be-recognized speech at the current decoding time instant may be determined based on the determined probability scores of the commonly-used character nodes and the determined probability scores of the hot word nodes.

It can be understood that since there are two kinds of classifiers, namely, the static classifier and the hot word classifier, the classifying module may further include a determiner to determine the result of which classifier is to be served as the final recognition result. The determiner outputs a scalar probability value $P_b^t$ representing a probability score that the result of the hot word classifier/static classifier serves as the final output result at the current decoding time instant t.

For example, in the case that $P_b^t$ represents the probability score that the result of the hot word classifier is the final output result at the current decoding time instant t, $P_b^t$ may be expressed as $$P_b^t = \text{sig moid}(<w_b, h_t^d>)$$

where $w_b$ represents a model parameter and is a weight vector with a same dimension as $h_t^d$, and sigmoid represents a neural network activation function.

The process that the determiner determines the recognition result of the to-be-recognized speech at the current decoding time instant according to the probability scores output by the two classifiers specifically includes as follows.

For the i-th (i ranges from 1 to N, inclusive) hot word node among the N hot words, a score of the i-th hot word in the probability distribution outputted by the static classifier is 0, and a probability score of the i-th hot word in the hot word classifier is $b_i^t$, and thus the final probability score of the i-th hot word is $P_b^t*b_i^t$. For $y_t$ among the V commonly-used characters, a score of $y_t$ in the probability distribution outputted by the static classifier is $P_v(y_t)$, and a probability score of $y_t$ in the hot word classifier is $P_v(y_t)*b_0^t$, and thus the final probability score of $y_t$ is $(1-p_b^t)*P_v(y_t)+P_b^t*P_v(y_t)*b_0^t$.

In another embodiment of the present disclosure, a method for training the speech recognition model described above is provided.

Since the speech recognition model according to the present disclosure is capable of recognizing any hot word, it is inappropriate to assign a limit on the hot words when training the model. Therefore, in the present disclosure, an annotation segment may be randomly selected from a text annotation of training data as a hot word for training the model. The process for training the model may include the following steps S1 to S4.

In step S1, speech training data marked with a recognition text is acquired. A text annotation sequence of the speech training data may be expressed as: $Y=[y_0, y_1, \ldots y_t, \ldots y_T]$, where $y_t$ represents a t-th character in the text annotation sequence, and T+1 represents the total number of characters in the recognition text. $y_0$ represents a starting sign "<s>" of a sentence, and $y_T$ represents an end sign "</s>" of the sentence.

Taking Chinese speech recognition as an example, the modeling is performed by taking a single Chinese character as a unit. Assuming that Chinese text content of a sentence is "HUAN YING LAI DAO KE DA XUN FEI (Welcome to iFlytech Company)", the text content has a total of 8 Chinese characters, plus the starting sign and the end sign of the sentence, to get the text annotation sequence with a total of 10 characters. Therefore, the text annotation sequence is expressed as: Y=[<s>HUAN, YING, LAI, DAO, KE, DA, XUN, FEI,</s>].

In step S2, an audio feature of the speech training data is acquired.

The audio feature may be a FilterBank feature, a Mel frequency cepstral coefficient (MFCC) feature, a perceptual linear prediction (PLP) feature, or the like.

In step S3, an annotation segment is randomly selected from an annotation text of the speech training data as a training hot word.

Specifically, two parameters P and N may be predetermined in the present disclosure. P presents a probability that a sentence of speech training data is selected as the training hot word, and N presents the maximum number of characters in the selected training hot word. Any one sentence of speech training data is selected as the training hot word at the probability of P and a maximum of N characters from the text annotation sequence of the sentence are selected as the training hot words. Taking "HUAN YING LAI DAO KE DA XUN FEI" as an example, the comparison between annotations of the training hot words selected from this sentence is shown in the following table.

| Original annotation | <s> | HUAN | YING | LAI | DAO | KE | DA | XUN | FEI | <s> |
|---|---|---|---|---|---|---|---|---|---|---|
| First annotation | <s> | HUAN | YING | LAI | DAO | KEDA XUNFEI | <bias> | <s> | | |
| Second annotation | <s> | HUAN | YING | LAI | DAO | KEDA | XUN | FEI | <bias> | <s> |

In the table, the first annotation is for the case that "KE DA XUN FEI" is selected as the training hot word, and the second first annotation is for the case that "KE DA" is selected as the training hot word.

It can be seen that if "KE", "DA", "XUN" and "FEI" in the original annotation are selected as the hot words, the four characters are used to be combined into one word "KE DA XUN FEI", and a special sign <bias> is added behind the word. The sign <bias> is used to introduce a training error and to update the model parameter related to the training hot word, such as the hot word encoding module, during the process of training the model. In a case that "KE DA XUN FEI" or "KE DA" is selected as the training hot word, it used to add "KE DA XUN FEI" or "KE DA" to a list of the training hot words to be updated in the model as an input of the hot word encoding module and a classification node of the training hot word in the classifying module. The training hot word is independently selected whenever the model is updated, and the list of the training hot words is initially empty.

In step S4, the speech recognition model is trained by using the training hot word, the audio feature, and the recognition text of the speech training data.

Specifically, the training hot word and the audio feature are inputted as training sample, and the recognition text of the speech training data serves as annotation of the sample, to train the speech recognition model.

A speech recognition apparatus is further provided according to an embodiment of the present disclosure, which is described below. The speech recognition apparatus may refer to the speech recognition method described above.

Figure 6:
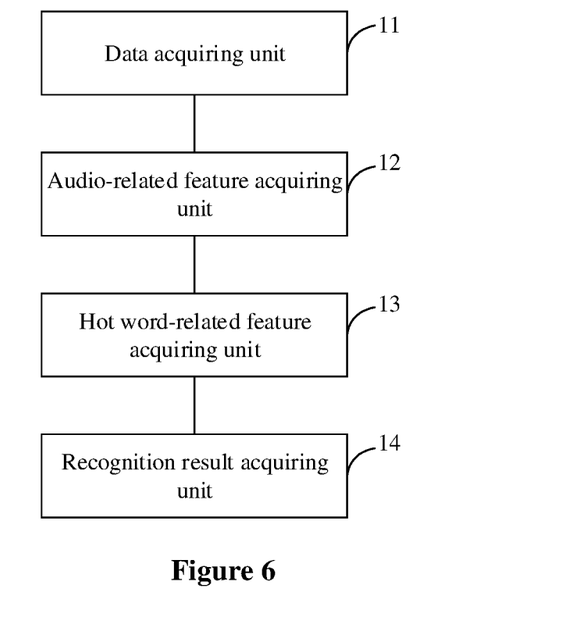
FIG. 6 is a schematic structural diagram of an speech recognition apparatus according to an embodiment of the present disclosure.

FIG. 6 is a schematic structural diagram of a speech recognition apparatus according to an embodiment of the present disclosure. The speech recognition apparatus may include a data acquiring unit 11, an audio-related feature acquiring unit 12, a hot word-related feature acquiring unit 13 and a recognition result acquiring unit 14.

The data acquiring unit 11 is configured to acquire a to-be-recognized speech and a configured hot word library.

The audio-related feature acquiring unit 12 is configured to determine, based on the to-be-recognized speech and the hot word library, an audio-related feature used at a current decoding time instant.

The hot word-related feature acquiring unit 13 is configured to determine, based on the audio-related feature, a hot word-related feature used at the current decoding time instant from the hot word library.

The recognition result acquiring unit 14 is configured to determine, based on the audio-related feature and the hot word-related feature, a recognition result of the to-be-recognized speech at the current decoding time instant.

In an embodiment, the audio-related feature acquiring unit includes a first audio-related feature acquiring sub-unit and a second audio-related feature acquiring sub-unit.

The first audio-related feature acquiring sub-unit is configured to acquire decoded result information before the current decoding time instant.

The second audio-related feature acquiring sub-unit is configured to determine, based on the decoded result information and the hot word library, the audio-related feature used at the current decoding time instant from the to-be-recognized speech.

In an embodiment, the audio-related feature acquiring unit, the hot word-related feature acquiring unit, and the recognition result acquiring unit are implemented by the speech recognition model. Specifically, the to-be-recognized speech and the hot word library are processed by the pre-trained speech recognition model, to obtain the recognition result of the to-be-recognized speech outputted by the speech recognition model.

The speech recognition model is capable of receiving and processing the to-be-recognized speech and the hot word library to output the recognition result of the to-be-recognized speech.

Specifically, the speech recognition model is capable of: determining, based on the decoded result information before the current decoding time instant and the hot word library, the audio-related feature used at the current decoding time instant from the to-be-recognized speech; determining, based on the audio-related feature, the hot word-related feature used at the current decoding time instant from the hot word library; and determining, based on the audio-related feature and the hot word-related feature, the recognition result of the to-be-recognized speech at the current decoding time instant.

In an embodiment, the speech recognition model includes an audio encoding module, a hot word encoding module, a joint attention module, a decoding module and a classifying module.

The audio encoding module is configured to encode the to-be-recognized speech, to obtain an audio encoding result.

Specifically, the audio encoding module encodes the audio feature, to obtain an audio feature vector sequence formed by audio feature vectors of all frames of speech.

The hot word encoding module is configured to encode each of hot words in the hot word library, to obtain a hot word encoding result.

Specifically, the hot word encoding module encodes each hot word separately, to obtain a hot word feature vector sequence formed by hot word feature vectors obtained by encoding separately hot words.

The joint attention module is configured to receive and process the audio encoding result and the hot word encoding result, to obtain a combined feature used at the current decoding time instant. The combined feature includes the audio-related feature and the hot word-related feature.

The decoding module is configured to receive and process the combined feature used at the current decoding time instant, to obtain an output feature of the decoding module at the current decoding time instant.

The classifying module is configured to determine the recognition result of the to-be-recognized speech at the current decoding time instant by using the output feature of the decoding module at the current decoding time instant.

In an embodiment, the joint attention module may include a first attention model and a second attention model.

The first attention model is used to determine the audio-related feature used at the current decoding time instant from the audio encoding result based on a state vector outputted by the decoding module at the current decoding time instant and the hot word encoding result, where the state vector represents the decoded result information.

Specifically, the state vector and the hot word encoding result serve as inputs of the first attention model, and the first attention model is configured to determine the audio-related feature used at the current decoding time instant from the audio encoding result.

The second attention model is used to determine the hot word-related feature used at the current decoding time instant from the hot word encoding result based on the audio-related feature.

Specifically, the audio-related feature serves as an input of the second attention model, and the second attention model is configured to determine the hot word-related feature used at the current decoding time instant from the hot word encoding result.

The audio-related feature and the hot word-related feature are combined into the combined feature used at the current decoding time instant.

In an embodiment, the process that the hot word encoding module encodes each hot word separately includes: separately encoding, by the hot word encoding module, the hot words into hot word feature vectors with a same dimension according to a predetermined dimension.

In an embodiment, the process that the first attention model determines the audio-related feature used at the current decoding time instant from the audio feature vector sequence based on the state vector representing the decoded result information outputted by the decoding module at the current decoding time instant and the hot word feature vector sequence may include:

taking, by the first attention model, a combination of each hot word feature vector in the hot word feature vector sequence and the state vector as a query; performing, by the first attention model, an attention mechanism operation on the audio feature vector sequence, to obtain a matching coefficient matrix, where the matching coefficient matrix includes a matching degree between each hot word and each frame of speech; and determining, by the first attention model, the audio-related feature used at the current decoding time instant from the audio feature vector sequence based on the matching coefficient matrix.

In an embodiment, the process that the first attention model determines the audio-related feature used at the current decoding time instant from the audio feature vector sequence based on the matching coefficient matrix may include:

determining, based on the matching coefficient matrix, a probability that each hot word is the to-be-decoded character at the current decoding time instant;

determining, based on the matching coefficient matrix and the probability that each hot word is the to-be-decoded character at the current decoding time instant, a probability that each frame of speech is speech content used at the current decoding time instant; and taking the probability that each frame of speech is the speech content used at the current decoding time instant as a weighting coefficient, weighting and summing audio feature vectors of all frames of speech in the audio feature vector sequence, to obtain the audio-related feature used at the current decoding time instant.

In an embodiment, the process that the second attention model determines the hot word-related feature used at the current decoding time instant from the hot word feature vector based on the audio-related feature may include:

taking, by the second attention model, the audio-related feature as the query, and performing, by the second attention model, the attention mechanism operation on the hot word feature vector sequence, to obtain a hot word matching coefficient vector, where the hot word matching coefficient vector includes a probability that each hot word is a to-be-decoded character at the current decoding time instant; and taking the probability that each hot word is the to-be-decoded character at the current decoding time instant as the weighting coefficient, weighting and summing the hot word feature vectors of all hot words in the hot word feature vector sequence, to obtain the hot word-related feature used at the current decoding time instant.

In an embodiment, the joint attention module may further transmit the hot word matching coefficient vector to the classifying module, and the classifying module is specifically configured to determine the recognition result of the to-be-recognized speech at the current decoding time instant by using the output feature of the decoding module at the current decoding time instant and the hot word matching coefficient vector.

In an embodiment, classification nodes of the classifying module include both fixed commonly-used character nodes and dynamically expandable hot word nodes. Based on this, the classifying module is configured to:
  determine a probability score of each of the commonly-used character nodes and a probability score of each of the hot word nodes by using the output feature of the decoding module at the current decoding time instant; and
  determine the recognition result of the to-be-recognized speech at the current decoding time instant based on the probability score of each of the commonly-used character nodes and the probability score of each of the hot word nodes.

Specifically, the classifying module is configured to:
  determine the probability score of each of the commonly-used character nodes by using the output feature of the decoding module at the current decoding time instant;
  determine the probability score of each of the hot word nodes by using the hot word matching coefficient vector; and
  determine the recognition result of the to-be-recognized speech at the current decoding time instant based on the probability score of each of the commonly-used character nodes and the probability score of each of the hot word nodes.

In an embodiment, the apparatus according to the present disclosure further includes a unit for training a model. The unit for training a model is configured to:
  acquire speech training data marked with a recognition text;
  acquire an audio feature of the speech training data;
  randomly select an annotation segment is from an annotation text of the speech training data as a training hot word; and
  train a speech recognition model by using the training hot word, the audio feature, and the recognition text of the speech training data.

In an embodiment, the process that a data acquisition unit acquires the audio feature of the to-be recognized-speech may include acquiring one of the following audio feature of the to-be recognized-speech: a FilterBank feature, a Mel frequency cepstrum coefficient (MFCC) feature, a perceptual linear prediction (PLP) feature, or the like.

Figure 7:
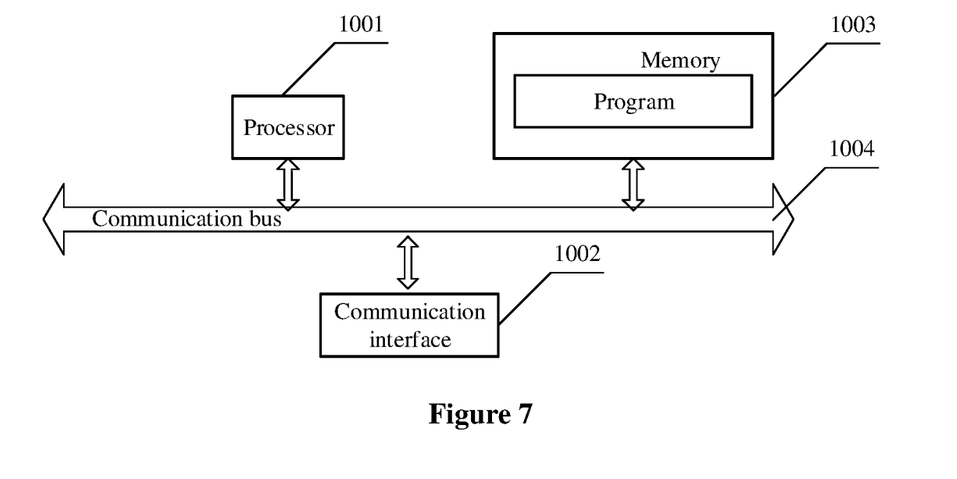
FIG. 7 is a schematic structural diagram of an electronic device according to an embodiment of the present disclosure.

An electronic device is further provided according to an embodiment of the present disclosure. Reference is made to FIG. 7, which is a schematic structural diagram of the electronic device. The electronic device may include at least one processor 1001, at least one communication interface 1002, at least one memory 1003 and at least one communication bus 1004.

In the embodiment of the present disclosure, the numbers of the processor 1001, the communication interface 1002, the memory 1003, and the communication bus 1004 are each at least one, and the processor 1001, the communication interface 1002, and the memory 1003 communicate with each other through the communication bus 1004.

The processor 1001 may be a central processing unit (CPU), an application specific integrated circuit (ASIC), or one or more integrated circuits configured to implement embodiments of the present disclosure.

The memory 1003 may include a high-speed RAM memory, a non-volatile memory and the like, for example, at least one disk memory.

The memory stores a program, and the processor may call the program stored in the memory. The program is used to:
  acquire a to-be-recognized speech and a configured hot word library;
  determine, based on the to-be-recognized speech and the hot word library, an audio-related feature used at a current decoding time instant;
  determine, based on the audio-related feature, a hot word-related feature used at the current decoding time instant from the hot word library; and
  determine, based on the audio-related feature and the hot word-related feature, a recognition result of the to-be-recognized speech at the current decoding time instant.

In an embodiment, specific functions and extended functions of the program may refer to the above description.

A readable storage medium is further provided according to an embodiment of the present disclosure. The readable storage medium stores a program executable by a processor. The program is used to:
  acquire a to-be-recognized speech and a configured hot word library;
  determine, based on the to-be-recognized speech and the hot word library, an audio-related feature used at a current decoding time instant;
  determine, based on the audio-related feature, a hot word-related feature used at the current decoding time instant from the hot word library; and
  determine, based on the audio-related feature and the hot word-related feature, a recognition result of the to-be-recognized speech at the current decoding time instant.

A computer program product is further provided according to an embodiment of the present disclosure. The computer program product, when being executed on a terminal device, causes the terminal device to perform the speech recognition method according to any one of the above embodiments.

It should be noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . ." does not exclude the case that other similar elements may exist in the process, method, article or device.

The embodiments in this specification are described in a progressive way, each of which emphasizes the differences from others. The embodiments may be combined as needed, and the same or similar parts among the embodiments may be referred to each other.

With the above description of the embodiments of the disclosure, the disclosure may be implemented or used by those skilled in the art. Various modifications to the embodiments are apparent to those skilled in the art, and the general principle defined in the disclosure may be implemented with other embodiments without departing from the spirit or scope of the disclosure. Therefore, the disclosure is not limited to the described embodiments, but claims a widest scope consistent with the principle and novel features of the disclosure.

The invention claimed is:

1. A speech recognition method, comprising:
acquiring a to-be-recognized speech and a configured hot word library;
determining, by using a pre-trained speech recognition model based on the to-be-recognized speech and the hot word library, an audio-related feature used at a current decoding time instant;
determining, by using the speech recognition model based on the audio-related feature, a hot word-related feature used at the current decoding time instant from the hot word library; and
determining, by using the speech recognition model based on the audio-related feature and the hot word-related feature, a recognition result of the to-be-recognized speech at the current decoding time instant,
wherein the determining, based on the to-be-recognized speech and the hot word library, the audio-related feature used at the current decoding time instant comprises:
acquiring decoded result information before the current decoding time instant; and
determining, based on the decoded result information and the hot word library, the audio-related feature used at the current decoding time instant from the to-be-recognized speech,
wherein the audio-related feature comprises complete audio information of potential hot words, and
wherein the speech recognition model comprises a hot word encoding module, a joint attention module, and a decoding module,
wherein the joint attention module comprises a first attention model and a second attention model, the first attention model is configured to determine, based on a state vector outputted by the decoding module at the current decoding time instant and a hot word encoding result outputted by the hot word encoding module, the audio-related feature used at the current decoding time instant from the audio encoding result, wherein the state vector represents the decoded result information; the second attention model is configured to determine, based on the audio-related feature, the hot word-related feature used at the current decoding time instant from the hot word encoding result; and the audio-related feature and the hot word-related feature are combined into a combined feature used at the current decoding time instant.

2. The method according to claim 1, wherein the process of determining, based on the to-be-recognized speech and the hot word library, an audio-related feature used at a current decoding time instant; determining, based on the audio-related feature, a hot word-related feature used at the current decoding time instant from the hot word library; and determining, based on the audio-related feature and the hot word-related feature, a recognition result of the to-be-recognized speech at the current decoding time instant comprises:
processing, by a pre-trained speech recognition model, the to-be-recognized speech and the hot word library, to obtain the recognition result of the to-be-recognized speech outputted by the speech recognition model, wherein,
the speech recognition model is capable of receiving and processing the to-be-recognized speech and the hot word library to output the recognition result of the to-be-recognized speech.

3. The method according to claim 2, wherein the speech recognition model comprises an audio encoding module and a classifying module,
the audio encoding module is configured to encode the to-be-recognized speech, to obtain an audio encoding result;
the hot word encoding module is configured to encode each of hot words in the hot word library, to obtain the hot word encoding result;
the joint attention module is configured to receive and process the audio encoding result and the hot word encoding result, to obtain a combined feature used at the current decoding time instant, wherein the combined feature comprises the audio-related feature and the hot word-related feature;
the decoding module is configured to receive and process the combined feature used at the current decoding time instant, to obtain an output feature of the decoding module at the current decoding time instant; and
the classifying module is configured to determine the recognition result of the to-be-recognized speech at the current decoding time instant by using the output feature of the decoding module at the current decoding time instant.

4. The method according to claim 1, wherein the first attention model determining the audio-related feature used at the current decoding time instant from the audio encoding result based on a state vector outputted by the decoding module at the current decoding time instant representing the decoded result information and the hot word encoding result comprises:
taking the state vector and the hot word encoding result as inputs of the first attention model, and determining, by the first attention model, the audio-related feature used at the current decoding time instant from the audio encoding result.

5. The method according to claim 1, wherein the second attention model determining the hot word-related feature used at the current decoding time instant from the hot word encoding result based on the audio-related feature comprises:
taking the audio-related feature as an input of the second attention model, and determining, by the second attention model, the hot word-related feature used at the current decoding time instant from the hot word encoding result.

6. The method according to claim 3, wherein classification nodes of the classifying module comprise fixed commonly-used character nodes and dynamically expandable hot word nodes, and the classifying module determining the recognition result of the to-be-recognized speech at the current decoding time instant by using the output feature of the decoding module at the current decoding time instant comprises:
determining, by the classifying module, a probability score of each of the commonly-used character nodes and a probability score of each of the hot word nodes by using the output feature of the decoding module at the current decoding time instant; and determining the recognition result of the to-be-recognized speech at the current decoding time instant based on the probability scores of the commonly-used character nodes and the probability scores of the hot word nodes.

7. The method according to claim 6, wherein the dynamically expandable hot word nodes and the hot words in the hot word library are in one-to-one correspondence.

8. The method according to claim 1, wherein the acquiring a to-be-recognized speech and a configured hot word library comprises:
acquiring the to-be-recognized speech, and determining a scenario of the to-be-recognized speech; and
acquiring the hot word library related to the scenario.

9. The method according to claim 1, wherein the acquiring a to-be-recognized speech and a configured hot word library comprises:
acquiring a speech of a user in a scenario of human-computer interaction, and determining the speech as the to-be-recognized speech; and
acquiring the configured hot word library formed by operation keywords in a voice command of the user in the scenario of human-computer interaction.

10. The method according to claim 9, further comprising:
determining, based on the recognition result of the to-be-recognized speech, an interaction response matching the recognition result, and outputting the interaction response.

11. A speech recognition device comprising:
a memory, configured to store a program; and
a processor, configured to execute the program, to perform:
acquiring a to-be-recognized speech and a configured hot word library;
determining, by using a pre-trained speech recognition model based on the to-be-recognized speech and the hot word library, an audio-related feature used at a current decoding time instant;
determining, by using the speech recognition model based on the audio-related feature, a hot word-related feature used at the current decoding time instant from the hot word library; and
determining, by using the speech recognition model based on the audio-related feature and the hot word-related feature, a recognition result of the to-be-recognized speech at the current decoding time instant,
wherein the determining, based on the to-be-recognized speech and the hot word library, the audio-related feature used at the current decoding time instant comprises:
acquiring decoded result information before the current decoding time instant; and
determining, based on the decoded result information and the hot word library, the audio-related feature used at the current decoding time instant from the to-be-recognized speech,
wherein the audio-related feature comprises complete audio information of potential hot words, and
wherein the speech recognition model comprises a hot word encoding module, a joint attention module, and a decoding module,
wherein the joint attention module comprises a first attention model and a second attention model, the first attention model is configured to determine, based on a state vector outputted by the decoding module at the current decoding time instant and a hot word encoding result outputted by the hot word encoding module, the audio-related feature used at the current decoding time instant from the audio encoding result, wherein the state vector represents the decoded result information; the second attention model is configured to determine, based on the audio-related feature, the hot word-related feature used at the current decoding time instant from the hot word encoding result; and the audio-related feature and the hot word-related feature are combined into a combined feature used at the current decoding time instant.

12. A non-transitory machine readable storage medium having a computer program stored thereon, wherein
the computer program, when being executed by a processor, implements:
acquiring a to-be-recognized speech and a configured hot word library;
determining, by using a pre-trained speech recognition model based on the to-be-recognized speech and the hot word library, an audio-related feature used at a current decoding time instant;
determining, by using the speech recognition model based on the audio-related feature, a hot word-related feature used at the current decoding time instant from the hot word library; and
determining, by using the speech recognition model based on the audio-related feature and the hot word-related feature, a recognition result of the to-be-recognized speech at the current decoding time instant,
wherein the determining, based on the to-be-recognized speech and the hot word library, the audio-related feature used at the current decoding time instant comprises:
acquiring decoded result information before the current decoding time instant; and
determining, based on the decoded result information and the hot word library, the audio-related feature used at the current decoding time instant from the to-be-recognized speech,
wherein the audio-related feature comprises complete audio information of potential hot words,
wherein the speech recognition model comprises a hot word encoding module, a joint attention module, and a decoding module,
wherein the joint attention module comprises a first attention model and a second attention model, the first attention model is configured to determine, based on a state vector outputted by the decoding module at the current decoding time instant and a hot word encoding result outputted by the hot word encoding module, the audio-related feature used at the current decoding time instant from the audio encoding result, wherein the state vector represents the decoded result information; the second attention model is configured to determine, based on the audio-related feature, the hot word-related feature used at the current decoding time instant from the hot word encoding result; and the audio-related feature and the hot word-related feature are combined into a combined feature used at the current decoding time instant.

* * * * *